US009110940B2

(12) United States Patent
Markus

(10) Patent No.: US 9,110,940 B2
(45) Date of Patent: Aug. 18, 2015

(54) SUPPORTING TRANSACTIONS IN DISTRIBUTED ENVIRONMENTS USING A LOCAL COPY OF REMOTE TRANSACTION DATA AND OPTIMISTIC LOCKING

(75) Inventor: Mircea Markus, London (GB)

(73) Assignee: Red Hat, Inc., Raleigh, NC (US)

(*) Notice: Subject to any disclaimer, the term of this patent is extended or adjusted under 35 U.S.C. 154(b) by 269 days.

(21) Appl. No.: 13/408,249

(22) Filed: Feb. 29, 2012

(65) Prior Publication Data

US 2013/0226890 A1 Aug. 29, 2013

(51) Int. Cl.
*G06F 7/00* (2006.01)
*G06F 17/00* (2006.01)
*G06F 17/30* (2006.01)

(52) U.S. Cl.
CPC ................. *G06F 17/30371* (2013.01)

(58) Field of Classification Search
CPC .................. G06F 17/30348; G06F 17/30359; G06F 17/30362; G06F 17/30371
USPC .......................................... 707/695, 703, 704
See application file for complete search history.

(56) References Cited

U.S. PATENT DOCUMENTS

| | | | |
|---|---|---|---|
| 5,212,788 A | 5/1993 | Lomet et al. | |
| 5,966,706 A * | 10/1999 | Biliris et al. | 707/10 |
| 6,073,140 A | 6/2000 | Morgan et al. | |
| 6,135,646 A * | 10/2000 | Kahn et al. | 709/217 |
| 6,529,932 B1 * | 3/2003 | Dadiomov et al. | 718/101 |
| 6,564,215 B1 | 5/2003 | Hsiao et al. | |
| 6,636,851 B1 | 10/2003 | Bamford et al. | |
| 6,662,196 B2 * | 12/2003 | Holenstein et al. | 707/202 |
| 6,725,242 B2 | 4/2004 | Gardner | |
| 6,816,873 B2 | 11/2004 | Cotner et al. | |
| 7,702,658 B2 * | 4/2010 | Dunn | 707/999.201 |
| 7,933,881 B2 | 4/2011 | Richey et al. | |
| 7,991,971 B2 | 8/2011 | Groff et al. | |
| 8,219,852 B2 * | 7/2012 | Lind et al. | 714/15 |
| 8,266,122 B1 | 9/2012 | Newcombe et al. | |
| 2007/0078911 A1 * | 4/2007 | Lee et al. | 707/204 |
| 2008/0052322 A1 | 2/2008 | Gusciora | |
| 2008/0154980 A1 * | 6/2008 | Lorenz et al. | 707/202 |
| 2008/0294701 A1 | 11/2008 | Saraswati et al. | |
| 2009/0313311 A1 * | 12/2009 | Hoffmann et al. | 707/204 |
| 2010/0017572 A1 * | 1/2010 | Koka et al. | 711/159 |
| 2010/0191884 A1 * | 7/2010 | Holenstein et al. | 710/200 |
| 2012/0016849 A1 | 1/2012 | Garrod et al. | |
| 2012/0167098 A1 * | 6/2012 | Lee et al. | 718/101 |

(Continued)

OTHER PUBLICATIONS

Ruivo et al, Exploiting Total Order Multicast in Weakly Consistent Transactional Caches, Proceedings from the 17th IEEE Pacific Rim International Symposium on Dependable Computing, 2011, pp. 99-108.*

(Continued)

*Primary Examiner* — Marc Somers
(74) *Attorney, Agent, or Firm* — Lowenstein Sandler LLP

(57) ABSTRACT

A first process executing in a computer system in a data grid receives a request to perform at least one transaction operation of a transaction based on remote transaction data of at least one other process in the data grid. The at least one other process is capable to perform a prepare operation for a transaction. The first process identifies a local copy of the remote transaction data in a local data structure and performs the at least one transaction operation using the local copy of the remote transaction data without acquiring a lock on the remote transaction data.

20 Claims, 12 Drawing Sheets

(56) References Cited

U.S. PATENT DOCUMENTS

2012/0197994 A1    8/2012    Beerbower et al.
2013/0226891 A1    8/2013    Markus

OTHER PUBLICATIONS

Beerbower, Tom Oracle Coherence 3.6 Transaction Framework (pdf slides). 2010. Retrieved from the Oracle website: http://coherence.oracle.com/download/attachments/5112972/2011-01-13__Coh3.6-Transaction-Framework.pdf.

Oracle Coherence Developer's Guide Release 3.6.1, Dec. 2010. Retrieved Jan. 14, 2013 from the Oracle website: http://docs.oracle.com/cd/E15357_01/coh.360/e15723.pdf.

Rosa et al. "Goal-oriented self-management of in-memory distributed data grid platforms," In Cloud Computing Technology and Science (CloudCom), 2011 IEEE Third International Conference on, pp. 587-591, IEEE, 2011.

USPTO; Office Action for U.S. Appl. No. 13/408,904, mailed Jan. 16, 2013.

USPTO; Office Action for U.S. Appl. No. 13/408,904, mailed Aug. 14, 2013.

USPTO; Office Action for U.S. Appl. No. 13/408,904, mailed Dec. 17, 2013.

USPTO; Office Action for U.S. Appl. No. 13/408,904, mailed Jul. 1, 2014, 25 pp.

\* cited by examiner

SUPPORTING TRANSACTIONS IN DISTRIBUTED ENVIRONMENTS USING A LOCAL COPY OF REMOTE TRANSACTION DATA AND OPTIMISTIC LOCKING

RELATED APPLICATION

The present application is related to co-filed U.S. patent application Ser. No. 13/408,904 entitled "Managing Versions of Transaction Data Used for Multiple Transactions in Distributed Environments", which is assigned to the assignee of the present application.

TECHNICAL FIELD

Embodiments of the present invention relate to transactions in distributed environments, and more particularly, to supporting transactions in distributed environments using a local copy of remote transaction data and optimistic locking.

BACKGROUND

In traditional data storage systems, such as databases, consistency is usually achieved by a data locking mechanism to prevent data from being corrupted or invalidated when multiple users try to write to the same data. When a lock of the data is acquired for a transaction, the transaction has access to the locked data until the lock is released. Databases support the XA (X/Open XA) architecture and XA transactions, which are transactions that consist of multiple operations that access resources. For example, a banking application may conduct an XA transaction that consists of two operations (1) deduct money from a first bank account and (2) add money to a second bank account. The second account may be in another database system. Typically, either both of the operations relating to the XA transaction will be permanent, if successful, or none of them will occur. The XA standard uses a two-phase commit (2PC) protocol to ensure that all resources enlisted within a transaction either commit or rollback to a previous state. The first phase is preparation. If preparation is successful, the second phase of commitment can be initiated.

A pessimistic locking approach typically acquires locks with each write operation of a transaction. For example, a lock may be acquired when the first bank account balance is changed and a lock may be acquired when the second account balance is changed. In an optimistic locking approach, locks are usually not acquired until a transaction is being completed. For example, the transaction can change the account balances for the two bank accounts within its own transactions scope, even if the accounts are accessed by another transaction at the same time without acquiring a lock. In a typical distributed hybrid optimistic-pessimistic locking approach, local locks may be acquired as a transaction progresses and remote locks may be acquired when a transaction is prepared for a commitment.

Generally, when a database utilizes a pessimistic or a hybrid locking approach, the database throughput is greatly reduced because the database waits to acquire a lock for each operation for one transaction and waits until a lock is released to allow another transaction access to the same data. In a database, the transaction data is maintained by a single operating system process. Thus, even when a lock is acquired using optimistic locking, for example, during the commit phase of a transaction, other transactions are still not able to access the locked data. For example, if a first transaction has acquired a lock on data in the database and a second transaction wishes to access the same data, the second transaction waits until the lock is released because the data is not available elsewhere.

Data grids are an alternative to databases. A data grid distributes data across multiple operating system processes. The operating system processes can run an instance of a data grid application and can use a distribution algorithm to determine which processes in the data grid have the data for a transaction. Each process can own data and allow other processes access to the data. Unlike a database, the distributed data of a data grid removes single points of failure. Data grids that support XA transactions typically implement a pessimistic or hybrid locking approach and usually face the same shortcomings of having a greatly reduced throughput. Even if a data grid implements an optimistic locking approach, the data grid is usually not operating efficiently because the data grid keeps copies of the data for the optimistic locking in the same place where the data is actually located. Storing copies with that in the same location as the actual data may involve an increased number of expensive remote calls when the same data is accessed repeatedly in the scope of a transaction.

BRIEF DESCRIPTION OF THE DRAWINGS

Various embodiments of the present invention will be understood more fully from the detailed description given below and from the accompanying drawings of various embodiments of the invention.

DETAILED DESCRIPTION

Figure 1:
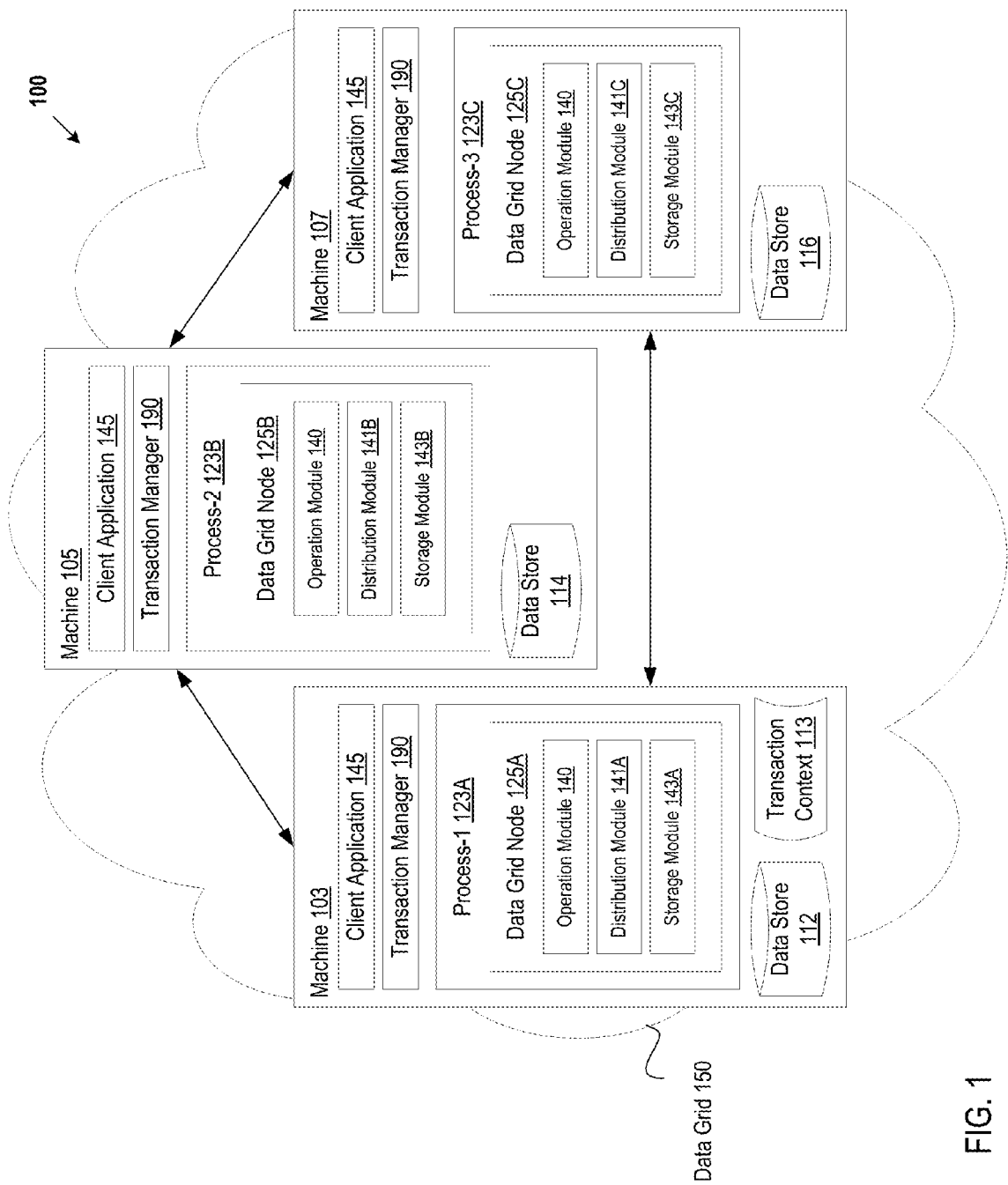
FIG. 1 illustrates exemplary network architecture, in accordance with various embodiments of the present invention.

Described herein are a method and apparatus for supporting transactions in a distributed environment using a local copy of remote transaction data and optimistic locking. A data grid distributes data across multiple operating system processes. A process "owning" transaction data for a transaction hereinafter refers to a process that has a capability to perform a prepare operation for the transaction. A process that owns transaction data for a transaction is hereinafter referred to as an "enlisted process." An enlisted process can be identified by a key that is contextually unique within a data grid. The data grid can use a distribution algorithm (e.g, consistent hash function) to identify which data is owned by which process in the data grid.

A process that manages a transaction is hereinafter referred to as a "transaction originator process." Transaction data for the transaction may not be owned by the transaction originator process and the transaction originator process can communicate with the enlisted process(es) which own the transaction data for a transaction. A transaction originator process has a data structure, hereinafter referred to as a "transaction context," that stores copies of transaction data that is owned by enlisted processes. A copy of transaction data in the transaction context is hereinafter referred to as a "local copy." Examples of a data structure can include, and are not limited to, arrays, tables, lists, etc.

In one embodiment, a first process (e.g., transaction originator process) executing in a computer system in a data grid receives a request, for example, from a client, application, to perform at least one transaction operation of a transaction based on remote transaction data that is owned by at least one other process in the data grid. The first process (e.g., transaction originator process) identifies a local copy of the remote transaction data in a local data structure (e.g., transaction context) and performs at least one transaction operation using the local copy of the remote transaction data without acquiring a lock on the remote transaction data at an enlisted process. The first process may already have a local copy of the remote transaction data in its transaction context. If the first process does not have a local copy of the data in its transaction context, the first process can fetch the data from the remote enlisted process and copy the data to its transaction context. When the local copy of data is in the transaction context, the transaction originator process can perform transaction operations using the local copies in the transaction context without acquiring data locks on the data at the enlisted process(es) until the transaction is being prepared. For example, Process-1 (e.g., transaction originator process) receives a request to perform two operations for a transaction: (1) determine the balance for a first bank account and (2) determine the balance of the second bank account. Process-2 (e.g., enlisted process) may own data for a first bank account and Process-3 (e.g., enlisted process) may own data for a second bank account. Process-1 can run a distribution algorithm (e.g., consistent hash function) to identify that Process-2 and Process-3 are the enlisted processes for the transaction data for the transaction. Process-1 can obtain a copy of the first bank account data from Process-2 and to obtain a copy of the second bank account data from Process-3 and store the copies in its transaction context. By storing a local copy of the data in the transaction context of Process-1, Process-2 and Process-3 do not have to maintain another version of the data for the transaction and the number of network call between Process-1 with Process-2 and Process-3 is minimized. Process-1 can provide the account balances of the bank accounts to the requester using the locally stored data in its transaction context. The transaction may include two additional operations: (3) deduct money from the first bank account and (4) add the deducted money to the second bank account. Process-1 can use the local copies of the data in its transaction context to change the account balances for the bank accounts without having to run the distribution algorithm again or having to contact Process-2 or Process-3 or having to acquire a lock on the remote transaction data at Process-2 and Process-3.

Embodiments greatly improve the efficiency of the operation of a data grid by minimizing the number of times a data grid runs a distribution algorithm over a cluster to determine which processes have the versions of data for a transaction. Embodiments collect a copy of the remote transaction data from the enlisted processes for the transaction and store the copies locally in the transaction context of the transaction originator process that is managing the transaction, which minimizes the number of round trips of network calls between the transaction originator process and enlisted process(es) to operate on the transaction data and manage the versions of the transaction data.

FIG. 1 is an exemplary network architecture 100 in which embodiments of the present invention can be implemented. The network architecture 100 can include multiple machines 103, 105, 107 connected via a network (not shown). The network may be a public network (e.g., Internet), a private network (e.g., a local area network (LAN)), or a combination thereof.

Machines 103, 105, 107 may be hardware machines such as desktop computers, laptop computers, servers, or other computing devices. Each of the machines 103, 105, 107 may include an operating system that manages an allocation of resources of the computing device (e.g., by allocating memory, prioritizing system requests, controlling input and output devices, managing file systems, facilitating networking, etc.). In one embodiment, one or more of the machines 103, 105, 107 is a virtual machine. For example, one or more of the machines may be a virtual machine provided by a cloud provider. In some instances, some machines may be virtual machines running on the same computing device (e.g., sharing the same underlying hardware resources). In one embodiment, one or more of the machines 103, 105, 107 is a Java Virtual Machine (JVM), which may run on a hardware machine or on another virtual machine.

Machines 103, 105, 107 each include one or more processes 123A-C. A process 123A-C is an operating system process (e.g., a Java Virtual Machine instance). A process 123A-C can run a data grid node 125A-C, which is an instance of a data grid application. A process 123A-C runs one data grid node 125A-C. For example, Process-1 123A runs data grid node 125A, Process-2 123B runs data grid node 125B, and Process-3 123C runs data grid node 125C. A machine 103, 105, 107 can run more than one process 123A-C and a corresponding data grid node 125A-C.

Each data grid node 125A-C may act as a server to clients and as a peer to other data grid nodes 125A-C. An in-memory data grid 150 is composed of multiple processes 123A-C that run on various machines 103, 105, 107 in the same cluster. The processes 123A-C and corresponding data grid nodes 125A-C may communicate with each other via the network to form the in-memory data grid 150. This may include using peer-to-peer protocols to establish and manage membership of the in-memory data grid 150. An in-memory data grid 150 may rely on main memory for data storage. In-memory data grids 150 are faster than disk-optimized data grids since disk interactions are generally much slower than in-memory interactions. For brevity and simplicity, an in-memory data grid 150 is used as an example of a data grid throughout this document.

In one embodiment, the in-memory data grid 150 operates in a client-server mode, in which the in-memory data grid 150 serves resources (e.g., a stateful data store 112, 114, 116 such as a cache) to client applications 145. In one embodiment, a machine 103, 105, 107 is a client machine hosting one or more applications 145. An application 145 can be any type of application including, for example, a web application, a desktop application, a browser application, etc. An application 145 can be hosted by one or more machines 103, 105, 107. In one embodiment, the in-memory data grid 150 acts as a shared storage tier for client applications 145. A separate memory space may be generated for each client application 145. In one embodiment, a client application 145 runs outside of the virtual machines (e.g., machines 103, 105, 107) of the data grid nodes 125A-C. In another embodiment, a client application 145 runs in the same virtual machine as a data grid node 125A-C. In another embodiment, a client application 145 may not be a Java-based application and may not be executed by a Java Virtual Machine.

A process 123A-C in the data grid 150 may execute data operations, such as to store objects, to retrieve objects, to perform searches on objects, etc. Unlike a database, the in-memory data grid 150 distributes stored data across data stores 112, 114, 116 (e.g., cache-nodes, grid-noes) in the multiple processes 123A-C. The in-memory data grid 150 can include a volatile in-memory data structure such as a distributed cache. Each process 123A-C can maintain a data store 112, 114, 116 (e.g., cache-node, grid-node). In one embodiment, the data grid 150 is a key-value based storage system to host the data for the in-memory data grid 150 in the data stores 112, 114, 116.

The key-value based storage system (e.g., data grid 150) can hold and distribute data objects based on a distribution algorithm (e.g., a consistent hash function). For example, the data grid 150 may store bank account objects with a key-value model of (accountNumber, accountObject). The data grid 150 can store a particular key-value pair by using a distribution algorithm to determine which of the processes 123A-C stores the particular value for the key-value pair and then place the particular value within that process. Each process 123A-C of the data grid 150 can use the distribution algorithm to allow key look up.

When a client application 145 is adding (e.g., writing) data to the data grid 150, the client application 145 can connect to any process 123A-C in the data grid 150 and provide the key-value pair (e.g., accountNumber, BankAccount instance) to the process. A process 123A-C can include a distribution module 141A-C to determine, based on the key (i.e. accountNumber) and a distribution algorithm, which process in the data grid 150 is the enlisted process where the data (e.g., key-value pair) is to be stored. The distribution module 141A-C may then send the key-value pair to the enlisted process 123A-C via the network. A process 123A-C can include a data storage module 143A-C to store the key-value pair in its corresponding data store 112, 114, 116.

For example, a client application 145 may connect to Process-1 123A and passes a key-value pair to Process-1 123A to add data to the data grid 150. The distribution module 141A of Process-1 123A uses the key and a distribution algorithm to identify that Process-2 123B is the enlisted process for the key. Process-2 123B stores the data that corresponds to the key in its data store 114. The distribution module 141A of Process-1 123A may then send the key-value pair to the enlisted process, Process-2 123B via the network. Upon receiving the key-value pair, the storage module 143B in Process-2 123B may store the key-value pair in its data store 114.

When a client application 145 is reading data from the data grid 150, the client application 145 provides the key of the data to be read to a process 123A-C. The client application 145 can connect to any process 123A-C and issue a get request passing the key to the process which the client connects to. For example, a client application 145 passes the key accountNumber to read the BankAccount objects that correspond to the key to Process-1 123A. The distribution module 141A of Process-1 123A can use the key and the distribution algorithm to determine which is process is the enlisted process that holds the given key. The distribution module 141A of Process-1 123A may then fetch the data (e.g., values for BankAccount objects) from the enlisted process and return the data to the client application 145.

Keys and the corresponding values may be owned and managed by more than one process and a corresponding cache. The ownership of the data is distributed amongst the multiple processes. The data is not owned by a single entity (e.g., process). For example, key "4442191224_Balance" and the corresponding value "400" may be owned by Process-2 123B running data grid node 125B. Key "86753090000_Balance" and the corresponding value "2000" may be owned by Process-3 123C running data grid node 125C.

Each data grid node 125A-C may act as a server for the data grid. Therefore, a client application 145 may communicate with any data grid node 125A-C of the in-memory data grid 150 to access data stored in the in-memory data grid 150. A client application 145 can request a number of data operations to be performed on the in-memory data grid 150. The data grid 150 can support multi-operational transactional access of the processes 123A-C and the corresponding data stores 112, 114, 116. A multi-operational transaction can be an XA (X/Open XA) transaction. For brevity and simplicity, an XA transaction is used as an example of a multi-operational transaction throughout this document. In the XA architecture, an XA transaction is a distributed transaction that consists of multiple operations that access one or more resources. Examples of transaction operations for a XA transaction can include, and are not limited to, start, read, write, prepare, commit, rollback, and recover operations. Performing operations that pertain to multi-operational transactional access on data in the in-memory data grid 150 may be performed by calling a get, put, remove, replace, start, prepare, commit, rollback, and recover functions on one or more processes 123A-C of the in-memory data grid 150.

The operations that pertain to an XA transaction are considered to be within the scope of an XA transaction. Some multi-operational transactional standards, such as the XA standard, use a two-phase commit (2PC) protocol to ensure that all resources enlisted within a transaction either commit or rollback any particular transaction consistently (all of the resources do the same). An XA transaction should succeed or fail as a complete unit. If any of the operations within the scope of an XA transaction are not successful, none of the operations within the scope of the XA transaction are committed to an in-memory data grid 150. For example, a banking application (e.g., client application 145) may wish to conduct a transaction that consists of three operations: (1) get the current balance for a first bank account, (2) deduct money from the first bank account, and (3) add the deducted money to a second bank account. Before any of the write operations are committed to the data grid 150, the success of performing of each write operation is first determined.

A client application 145 can initiate a transaction having multiple operations (e.g., get balance, reduce balance, increase balance) by communicating a start of a transaction to a transaction manager 190. A transaction manager 190 communicates with a client application 145 and with the various processes 123A-C in the data grid 150 to manage the transaction. In one embodiment, each of the processes 123A-C includes a transaction manager 190 to allow a client application 145 to initiate a transaction with any process 123A-C in the data grid 150.

A prepare operation includes taking steps, such as acquiring a lock on transaction data, to ensures that a future commit request may succeed. For example, the transaction data for a transaction having three operations (e.g., get balance in first account, reduce balance in first account, increase balance in second account) may be owned by Process-2 123B and Process-3 123C. Process-2 123B may own key "4442191224_Balance" and the corresponding value "400" and store the data in its data store 114. Process-3 123C may own key "8675309000_Balance" and the corresponding value "2000" and store the data in its data store 116. The transaction originator process, Process-1 123A, can communicate with the two enlisted processes, Process-2 123B and Process-3 123C, for the transaction.

A transaction originator process (e.g., Process-1 123A) can include a distribution module 141A to communicate with distribution module 141B in the enlisted processes (e.g., Process-2 123B, Process-3 123C) to obtain a copy of the remote transaction data stored in the data stores 114,116 of Process-2 123B and Process-3 123C. The transaction originator process (e.g., Process-1 123A) can include a storage module 143A to store the copies in the transaction context 113 of the transaction originator process (e.g., Process-1 123A). A transaction context 113 can be a data structure that stores copies of transaction data that is owned by enlisted processes. Examples of a data structure can include, and are not limited to, arrays, tables, lists, etc. The transaction originator process (e.g., Process-1 123A) can include an operation module 140 to perform transaction operations (e.g., get balance, reduce balance, increase balance) using the local copy of remote transaction data stored in its transaction context 113. In one embodiment, each process 123A-C runs a distribution module 141A-C, a storage module 143A-C, and an operation module 140. One embodiment of modules in a transaction originator process is described in greater detail below in conjunction with FIG. 2. One embodiment of modules in an enlisted process is described in greater detail below in conjunction with FIG. 4.

The transaction originator process (e.g., Process-1 123A) can make sure that either all of the operations (e.g., get balance, reduce balance, increase balance) within the scope of transaction successfully happen or none of them occur. For instance, there may be a system failure or an operation failure pertaining to one of the processes 123A-C related to the transaction with regard to deducting money from the first bank account and/or adding money to the second bank account. In such a case, the banking application 145 may wish that the operations that deducted money from the first bank account and adding money to the second account, as well as any other operations performed within the scope of the transaction, rollback to a previous state. A rollback command instructs the processes 123A-C related to a transaction to cause any operation that was performed for a particular transaction to be returned to a previous state. A commit command instructs the enlisted processes (e.g., processes 123B,C) to apply the change to allow other transactions to have access to the changed data.

The transaction originator process (e.g., Process-1 123A) and the enlisted processes (e.g., Process-2 123B, Process-3 123C) can use optimistic locking to ensure that either all of the operations for a transaction successfully happen or none of them are committed. Optimistic locking is a pattern of achieving locking in a data storage system, such as the data grid 150. Unlike some locking mechanisms, which lock data as each operation (e.g., write) occurs, optimistic locking does not attempt to acquire a lock on the data until a prepare phase. Optimistic locking is a concurrency control method that assumes that operations for a transaction can complete without affecting each other, and that the transaction operations can proceed without locking the transaction data that they affect until the transaction enters phase two (e.g., commit phase) of a two-phase commit protocol. During the commit phase and before an actual committment is made, each transaction operation is verified to ensure that no other transaction has modified the transaction data.

The transaction originator process and enlisted processes can use a version value associated with the local copy of remote transaction data in a transaction context 113 of transaction originator process (e.g. Process-1 123A) and the version value of the remoted transaction data stored in the data stores 114,116 of the enlisted processes (e.g., Process-2 123B, Process-3 123C) to determine whether the remote transaction data can be successfully prepared for a commit operation. Embodiments of using a version value to prepare a transaction operation for a commit is described in greater detail below in conjuniciton with FIG. 5 and FIG. 9. When the local copy in the transaction context 113 is no longer being used for the transaction, the distribution module 141A can remove the local copy from the transaction context 113 of transaction originator process.

Figure 2:
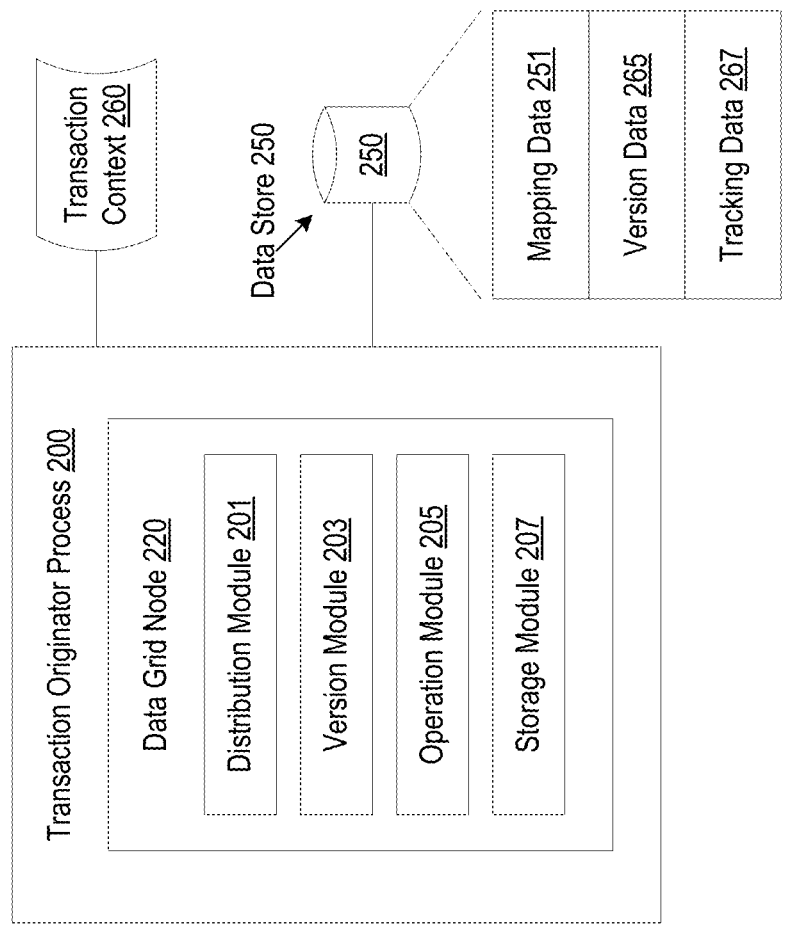
FIG. 2 is a block diagram of an embodiment of modules in a transaction originator process.

FIG. 2 illustrates a block diagram of one embodiment of modules in a transaction originator process 200. One embodiment of modules in an enlisted process are described in FIG. 4 below. The transaction originator process 200 runs a data grid node 220 and may correspond to Process-1 123A and data grid node 125A running in a machine 103 of FIG. 1. In one embodiment, the transaction originator process 200 includes a distribution module 201, a version module 203, an operation module 205, and a storage module 207.

The distribution module 201 can be coupled to a data store 250 that stores mapping data 251 that can be used to determine which data stores (e.g., caches) are associated with which processes. The distribution module 201 can use the mapping data 251 and a distribution algorithm (e.g., consistent hashing algorithm) to determine data-to-process associations to identify the enlisted processes that have cache data associated with a particular cache name for a transaction. For example, a transaction relates to changing Account-Balance data having the key "4442191224_Balance" and the distribution module 201 can use the data-to-process associations to determine that the key "4442191224_Balance" is owned by Process-2.

The distribution module 201 can check a transaction context 260 coupled to the distribution module 201 to determine whether a copy of the remote transaction data that is associated with the key is stored in the transaction context 260. The transaction context 260 can be a data structure, such as, and not limited to, arrays, tables, lists, etc., that stores copies of transaction data that is owned by enlisted processes.

The distribution module 201 can obtain a copy of the remote transaction data that is owned by the enlisted processes. The storage module 207 can store the copy in the transaction context 260. The distribution module 201 can create a local copy by sending a network call (e.g., remote procedure call (RPC)) to the enlisted process (e.g. Process-2) to request a copy of the remote transaction data.

The version module 203 can store version data 265 in the data store 250. The version data 265 can identify the version value of the local copy that is assigned to the local copy at the time the copy is stored in the transaction context 260. In one embodiment, the version data 265 can include a pointer to a version value that is maintained remotely at the enlisted process (e.g., Process-2). The version module 203 can create the version data 265 by sending a network call (e.g., RPC) to the enlisted process (e.g. Process-2) to establish a pointer to the version value at the enlisted process. In another embodiment, the version data 265 can include an actual version value.

At any time, the version module 203 can send a network call to an enlisted process to request a current version value that is associated with the key (e.g., key "4442191224_Balance") and can compare it to the version value represented in the version data 265 in the data store 250 to determine whether the version values match. For example, at the time Process-1 made a copy of the key "4442191224_Balance" and the corresponding value "400," the version value represented by version data 265 may have been a "0" value. Subsequently, Process-2 may have added a new version for the key "4442191224_Balance" and may have incremented the current version value to "1."

Figure 3:
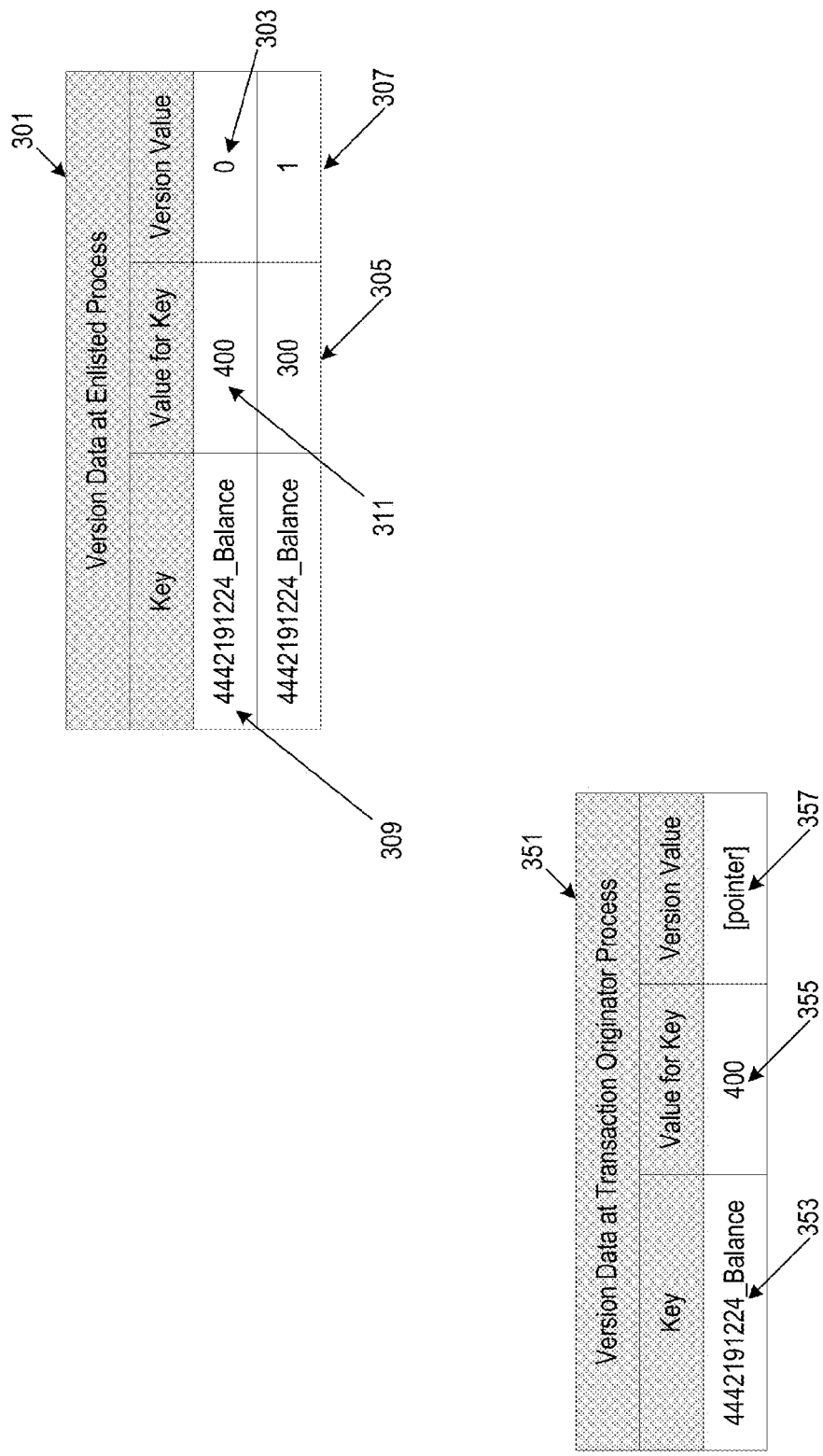
FIG. 3 illustrates exemplary version data, in accordance with an embodiment.

FIG. 3 illustrates exemplary version data stored at the enlisted process and at the transaction originator process, according to some embodiments. The version data maintained at the enlisted process can be a table 301 that includes entries having the key 309, value 311 for the key, and version value 303. The version data maintained at the transaction originator process can be a table 351 that includes the key 353, value for the key 355, and a pointer 357 to the version value 303 at the enlisted process that corresponds to when the local copy of the key 353 and value 355 was created at the transaction originator process. Subsequently, the enlisted process may update the value 311 of the key with a new value 305 and a new version value 307, for example, by adding a new entry to the table 301. The pointer 357 in the version data 351 at the transaction originator process is unchanged and continues to point to the version value 303 which corresponds to when the copy was created.

Returning to FIG. 2, the version module 203 may request a current version value (e.g., current version value 307 in FIG. 3) that is associated with the key (e.g., key "4442191224_Balance") from Process-2 and compare it to the version value (e.g., pointer 357 to version value 303 in FIG. 3) that is represented by the version data 265 in the data store 250 and determine whether there is a match.

The operation module 205 can receive requests to perform a transaction operation of a transaction. The request can be from an XA compliant transaction manager (e.g., XA compliant transaction manager 190 in FIG. 1) or a client application (e.g., client application 145 in FIG. 1). Examples of a transaction operation can include, and are not limited to, start, read, write, prepare, commit, and rollback. A read operation is also hereinafter referred to as a get operation. A write operation is also hereinafter referred to as a put operation. The operation module 205 can perform requested transaction operations, such as get, put, replace, using the local copy of the remote transaction data in the transaction context 260. For example, the operation module 205 can perform a get operation to provide a value to a requester (e.g., client application) using the local copy of key "4442191224_Balance" in the transaction context 260. In another example, the operation module 205 can perform a put operation to change a value using the local copy of key "4442191224_Balance" in the transaction context 260.

The operation module 205 can communicate with the enlisted processes to perform requested operations, such as prepare, commit, and rollback. The operation module 203 can send a message (e.g., prepare transaction message, commit transaction message) to the enlisted processes. A commit is to make a set of changes that were made to one or more caches for a particular XA transaction permanent. A prepare request can cause enlisted processes to take steps (e.g., acquire a lock) for ensuring that a future commit request will succeed. One embodiment of communicating with the enlisted processes to perform a transaction operation is described in greater detail below in conjunction with FIGS. 5A-B.

The enlisted processes can receive a message (e.g., prepare transaction message, commit transaction message) and send an appropriate response to the operation module 205 in the transaction originator process 200. Examples of the responses can include, and are not limited to, a response indicating that a prepare operation was successful, a response indicating that a prepare operation was not successful, and a response indicating a current version value associated with a particular transaction data. The operation module 205 can store tracking data 267 in the data store 250 to track the responses received from the enlisted processes. The operation module 205 can generate and send a message to a requester (e.g. client application) based on the tracking data 267. For example, when the operation module 205 receives a successful prepare response from all of the enlisted processes and the version module 203 determines that the version values match for each transaction data, the operation module 205 can send a message to the requester (e.g., client application) indicating that the multi-operational transaction is ready for commit.

Figure 4:
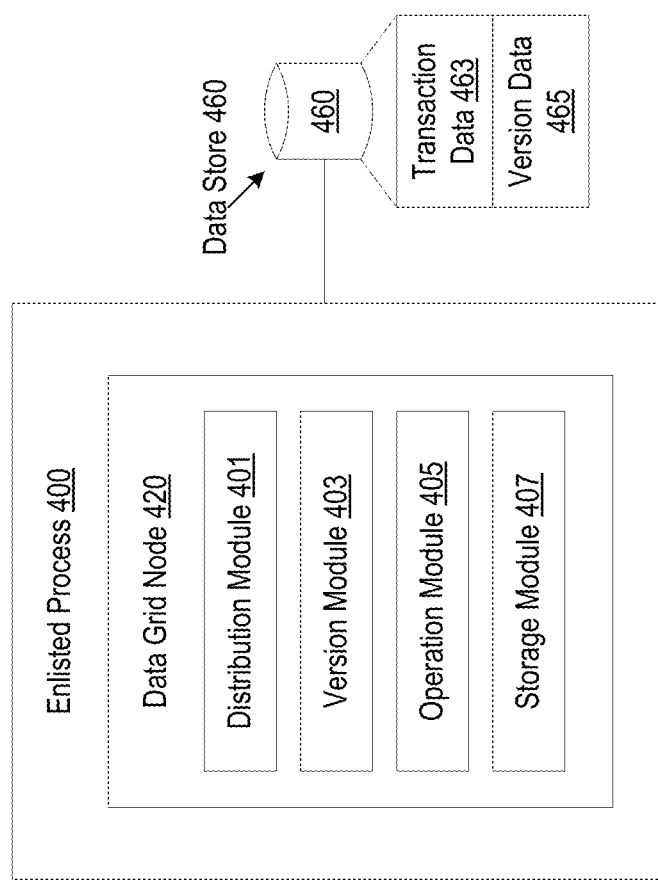
FIG. 4 is a block diagram of an embodiment of modules in an enlisted process.

FIG. 4 illustrates a block diagram of one embodiment of modules in an enlisted process 400. The enlisted process 400 and data grid node 420 may correspond to enlisted processes 123B,C and data grid nodes 125B,C running in machines 105,107 of FIG. 1. In one embodiment, the enlisted process 400 includes a distribution module 401, a version module 403, an operation module 405, and a storage module 407.

The distribution module 401 can receive a request from a transaction originator process (e.g., Process-1 123A in FIG. 1) for a copy of transaction data 463 or portion of the transaction data 463 that is stored in the data store 460 that is coupled to the distribution module 400. The request may be a network call (e.g., RPC). The request can include a key. The transaction data 463 is data that is owned and maintained by the enlisted process. The data store 460 can be a cache. The transaction data 463 can include key-value pairs (e.g., key-value pairs in table 301 in FIG. 3). The distribution module 401 can send a copy of the transaction data 463 for the requested key to the transaction originator process via a network call.

The operation module 405 can receive a request from a transaction originator process to perform a transaction operation, such as a prepare transaction, a commit transaction, and a rollback transaction. The request can be a network call (e.g., RPC). A prepare transaction request can include a key (e.g., "4442191224_Balance") and a new value for the key. A prepare transaction request can include a request to acquire a lock on the transaction data 463 for the requested key and to update the current value for the key using the new value received in the prepare transaction request. The operation module 405 can attempt to acquire a lock and update the current value for the key if a lock is acquired. The operation module 405 can send a message to the transaction originator process indicating whether the lock attempt was successful or not.

A commit transaction request can be a request to increment the version value for a key and to release the locks. The version module 403 can increment the version value for a key in the version data 465 and the operation module 405 can release the locks. The version module 403 can store version data 465 in the data store 260. The version data 465 can include a version value for the value of each pair (e.g., version value in table 301 in FIG. 3). For example, "400" may be the first value assigned to the key "4442191224_Balance" and the version value for the "400" may be "0." The version module 403 can increment the version value by adding a new version to the version data 465. For example, the version module 403 can add a new entry having the new version value to a table. The request for the copy of transaction data 463 for a particular key can include a request for the version value that is assigned to the transaction data 463 for the particular key. In one embodiment, the version module 403 sends a location of the version value to the transaction originator process and the transaction originator process stores a pointer to the location in a data store. In another embodiment, the version module 403 sends the version value (e.g., "0") to the transaction originator process and the transaction originator process stores the version value in a data store. At any point in time, the version module 403 can receive a request from a transaction originator process for a current version value that is associated with a key, and the version module 403 can send the current version value to the transaction originator process.

Figure 5A:
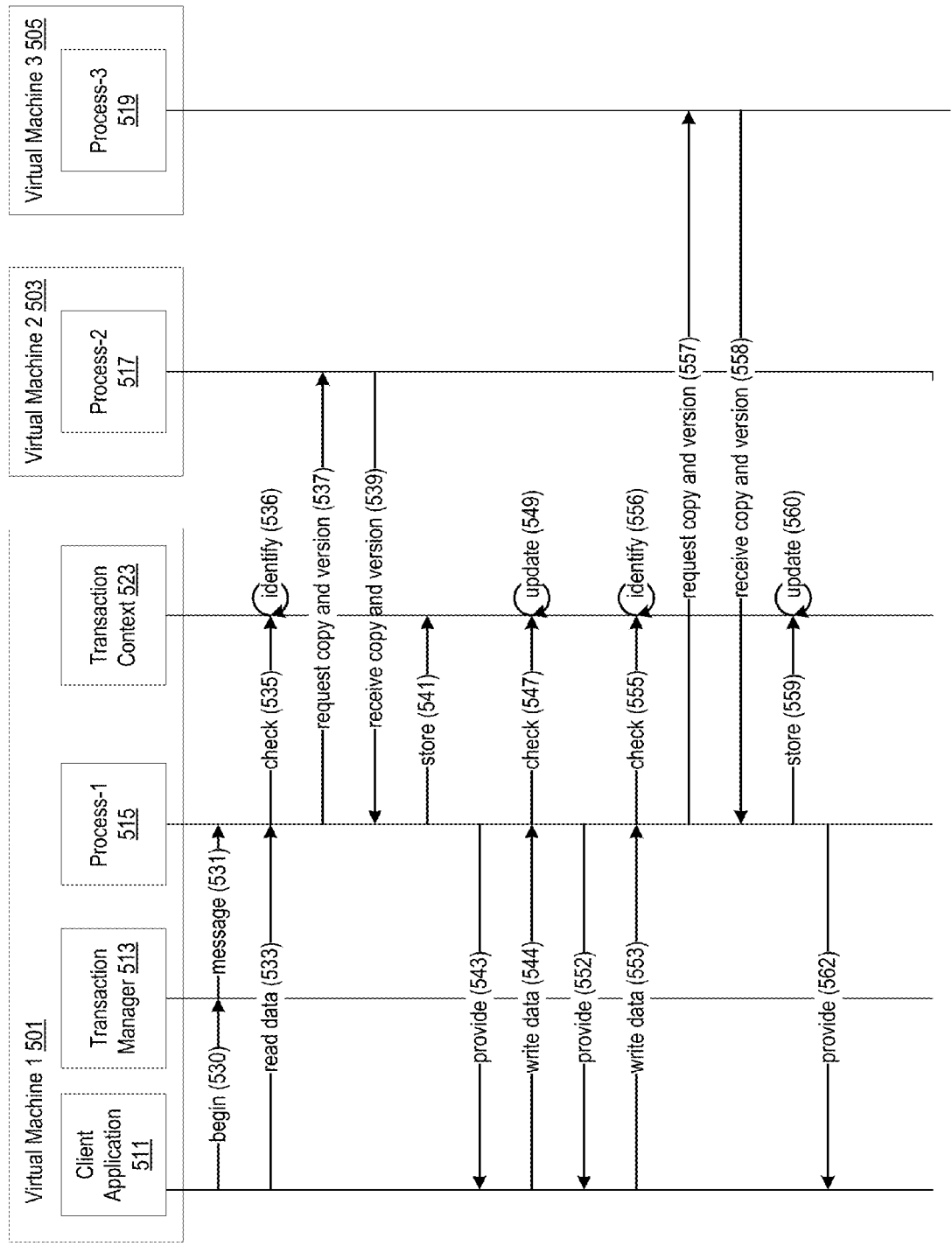
FIGS. 5A-B are block diagrams of one embodiment of virtual machines supporting transactions in a distributed environment using a local copy of remote transaction data and optimistic locking.
Figure 5B:
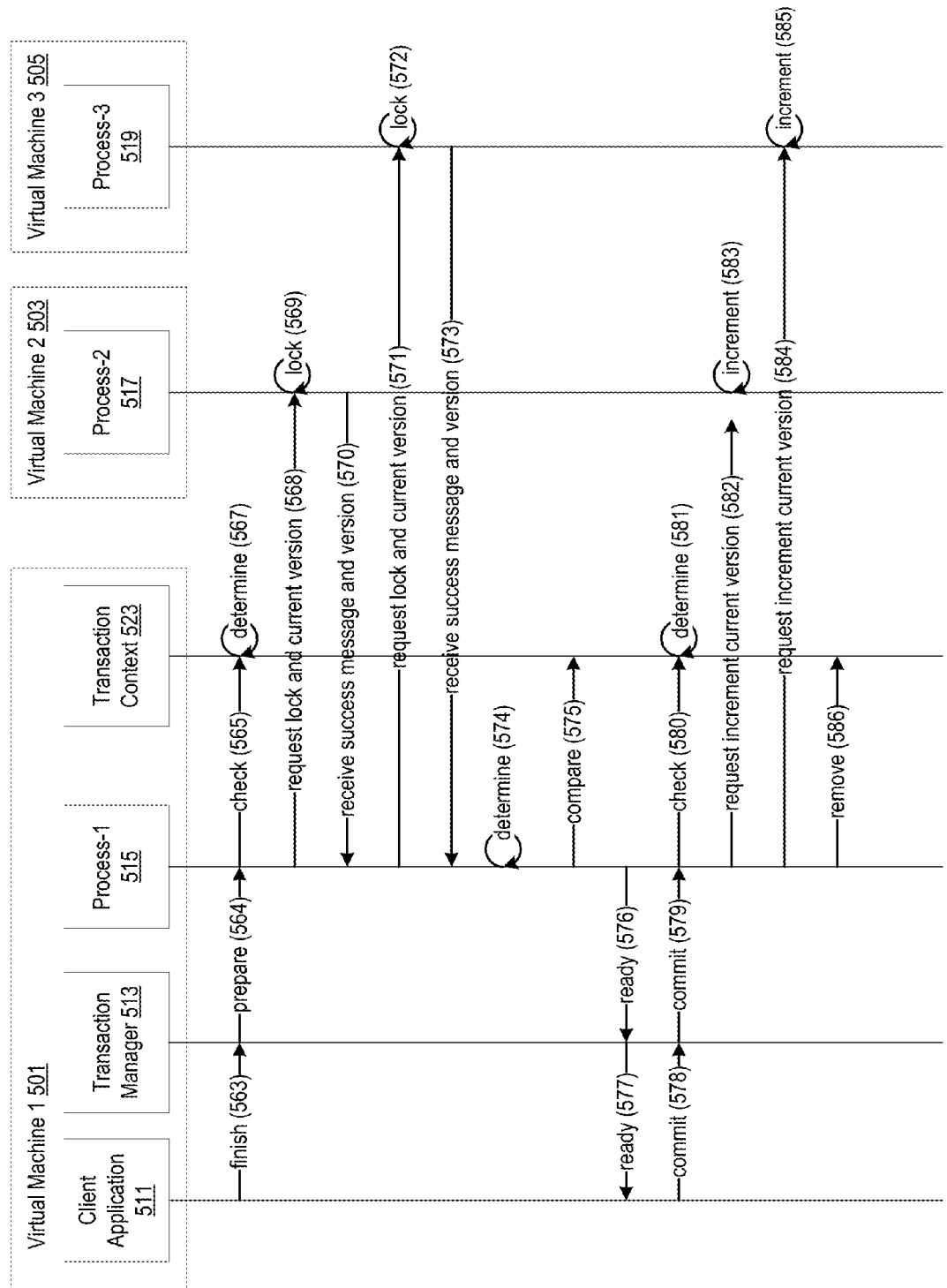

FIGS. 5A-B are block diagrams of one embodiment of supporting transactions in a distributed environment using a local copy of remote transaction data and optimistic locking. A first virtual machine 501 can include a client application 511, a transaction manager 513, a transaction originator Process-1 515 running a data grid node, and a transaction context 523. A second virtual machine 503 can include enlisted Process-2 517 running a data grid node. A third virtual machine 505 can include enlisted Process-3 519 running a data grid node.

A client application 511 sends (530) a begin transaction message to the transaction manager 513 that notifies the transaction manager 513 that all of the following operations are in the scope of a particular transaction. The transaction manager 513 sends (531) a message to the transaction originator Process-1 515 that all of the following operations are in the scope of a particular transaction.

A client application 511 sends (533) a read operation request for a XA transaction to the transaction originator Process-1 515. The read operation request can include one or more cache names and one or more keys identifying the transaction data associated with the read operation. For example, the read operation is a request relating to key "4442191224_Balance." The transaction originator Process-1 515 checks (535) the its transaction context 523 to determine whether a local copy of the requested key and the corresponding value is stored in the transaction context 523. If there is not a copy in the transaction context 523 the transaction originator Process-1 515 uses mapping data, a consistent hashing algorithm, and the key and cache name from the get request to identify (536) the process that owns and manages the key for the transaction. For example, the transaction originator Process-1 515 determines that Process-2 517 owns the transaction data having key "4442191224_Balance."

The transaction originator Process-1 515 requests (537) a copy of the remote transaction data (e.g., key and value) and a version value associated with the remote transaction data from the enlisted process, Process-2 517. The transaction originator Process-1 515 receives (539) the copy and version value and stores (541) the copy and the version value in the transaction context 523. For example, the value may be "400" and the version value may be "0." The transaction originator Process-1 515 can store a pointer in the transaction context 523 that points to a remote version value in the other process (e.g., Process-2 517). One embodiment of creating a copy of the remote transaction data in the local transaction context is described in greater detail below in conjunction with FIG. 7.

The transaction originator Process-1 515 provides (543) the value (e.g., "400") for key "4442191224_Balance" that is stored in the transaction context 523 to the client application 511.

The client application 511 sends (544) a write operation request for the same XA transaction to transaction originator Process-1 515. The write operation request can include one or more keys identifying the transaction data associated with the write operation and new value(s) associated with the write operation. For example, the write operation is a request for the new value "300" to be assigned to the key "4442191224_Balance" to replace the current value "400" to represent a $100 deduction in the bank account.

The transaction originator Process-1 515 checks (547) the context transaction context 523 to determine whether a local copy of the requested key and the corresponding value is stored in the transaction context 523. The transaction originator Process-1 515 locates the requested key and the corresponding value in the transaction context 523 and updates (549) the value for the requested key. The transaction originator Process-1 515 can replace the current value "400" for the key with the new value "300" or can add the new value "300" for the key "4442191224_Balance" in the transaction context 523. The transaction originator Process-1 515 updates (549) the value for the requested key in the transaction context 523, but the pointer to the version value (e.g., "0") is not changed in the version data stored in a data store. The pointer still points to the "0" value at Process-2 517. The transaction originator Process-1 515 updates (549) the value for the requested key in the transaction context 523 without acquiring a lock on the remote transaction data at Process-2 517. The transaction originator Process-1 515 provides (552) the previous value (e.g., 400) for key "4442191224_Balance" that is stored in the transaction context 523 to the client application 511.

The client application 511 sends (553) another write operation request for the same XA transaction to the transaction originator Process-1 515. For example, the write operation is a request for the new value "2100" to be assigned to the key "8675309000_Balance" to replace the current value "2000" to represent a $100 increase in the bank account. The transaction originator Process-1 515 checks (555) the transaction context 523 of Process-1 515 and determines that a local copy of the requested key and the corresponding value is not stored in the transaction context 523. The transaction originator Process-1 515 uses mapping data, a consistent hashing algorithm, and the key and cache name from the write request to identify (556) that Process-3 519 owns the transaction data having key "8675309000_Balance." The o transaction originator Process-1 515 requests (557) a copy of the transaction data (e.g., key and value) and a version value associated with the transaction data from the enlisted process, Process-3 519. The transaction originator Process-1 515 receives (558) the copy and version value and stores (559) the copy and the version value in the transaction context 523. For example, the stored value may be "2000" and the stored version value may be a pointer to "0" in Process-3 519.

The transaction originator Process-1 515 updates (560) the value in the transaction context 623 for the requested key. The transaction originator Process-1 515 updates (560) the value for the requested key in the transaction context 523 without acquiring a lock on the remote transaction data at Process-3 519. The transaction originator Process-1 515 can replace the current value "2000" for the key with the new value "2100" or can add the new value "2100" for the key "8675309000_Balance" in the transaction context 523. The transaction originator Process-1 515 updates (560) the value for the requested key in the transaction context 523, but the pointer to the version value (e.g., "0") is not changed in the version data store in the data store. The pointer still points to the "0" value at Process-3 519. The transaction originator Process-1 515 provides (562) the previous value (e.g., 2000) for key "8675309000_Balance" in the transaction context 523 to the client application 611.

In FIG. 5B, the client application 511 sends (563) a finish transaction request for the same XA transaction to the same transaction manager 513. The transaction manager 513 sends (564) a prepare message to the transaction originator Process-1 515 to initiate the first phase of a two-phase commit protocol. The first phase is a prepare phase and the second phase is a commit phase. The prepare message instructs Process-1 515 to prepare the XA transaction for a commit operation. Preparation can include, for example, and not limited to, one or more enlisted processes (e.g., Process-2 517, Process-3 519) in the data grid to acquire data locks for the particular transaction data which is changing.

The prepare transaction request can include the XID (XA compliant transaction identifier) for the transaction. The transaction manager 513 sends (564) a prepare transaction request to the transaction originator Process-1 515. The transaction originator Process-1 515 checks (565) the transaction context 523 to determine which keys are associated with the transaction. The transaction originator Process-1 515 uses mapping data, a consistent hashing algorithm, and the keys from the transaction context 523 to determine (567) which enlisted processes to send a prepare message to.

The transaction originator Process-1 515 sends (568, 571) a prepare message via network calls over the network to all of the enlisted processes (e.g., Process-2 517, Process-3 519) for the transaction to perform a prepare operation. The prepare transaction request can include the key(s) that should be locked and the corresponding new values for the keys. The key(s) that should be locked correspond to keys related to a write operation. Locks should not be acquired for keys that pertain to read operations.

The prepare message can also include a request for the enlisted process to provide a current version associated with the locked transaction data. The enlisted process (e.g., Process-2 517, Process-3 519) attempts to lock (569,572) the transaction data for the transaction. If the enlisted process 517,519 is not able to obtain a lock, for example, because the transaction data is already locked for another transaction, the enlisted process 517,519 sends a message to the transaction originator Process-1 515 indicating the failed lock attempt. One embodiment of a failed lock attempt is described in greater detail below in conjunction with FIG. 9. If the enlisted process 517,519 is able to obtain a lock, the enlisted process 517,519 locks the data and changes the value that corresponds to the key using the new value received in the prepare request and sends (570,573) a message to the transaction originator Process-1 515 indicating a successful lock attempt and the current version value associated with the locked transaction data.

The transaction originator Process-1 515 stores tracking data to keep track of the response messages it receives from the various enlisted processes 517,519. The transaction originator Process-1 515 determines (574) whether a successful lock message is received from each enlisted process 517,519. There can be any number of enlisted processes for a transaction. For brevity and simplicity, two enlisted process, Process-2 517 and Process-3 519, are used as an example in FIGS. 5A,B. If the transaction originator Process-1 515 determines there is not a successful lock message received from each enlisted process, the transaction originator Process-1 515 can send a message to the transaction manager 513 indicating a failed prepare. If the transaction originator Process-1 515 determines there is a successful lock message received from each enlisted process, the transaction originator Process-1 515 compares (575) the current version value associated with the locked transaction data with the version value that is represented in the transaction context 523.

If the version values do not match for at least one locked transaction data, the transaction originator Process-1 515 sends a message to the transaction manager 513 indicating a failed version match. One embodiment of a failed version match is described in greater detail below in conjunction with FIG. 9. If the version values match for each locked transaction data, the transaction originator Process-1 515 sends (576) a ready to commit message to the transaction manager 513. The transaction manager 513 send (577) the ready to commit message to the client application 511.

The client application 511 sends (578) a commit transaction request for the same XA transaction to the same transaction manager 513 to initiate the second phase of the two-phase commit protocol. A commit operation applies the changes relating to the transaction data such that the change can be read for other subsequent transactions. The commit transaction request can include the XID for the transaction. The transaction manager 513 sends (579) a commit transaction request to the transaction originator Process-1 515. The transaction originator Process-1 515 checks (580) the transaction context 523 to determine which keys are associated with the transaction. The transaction originator Process-1 515 uses mapping data, a consistent hashing algorithm, and the keys from the transaction context 523 to determine (581) which enlisted processes to send a commit message to.

The transaction originator Process-1 515 sends (582,584) a commit message via network calls over the network to all of the enlisted processes (e.g., Process-2 517, Process-3 519) for the transaction to perform a commit operation. The commit message can include a request for the enlisted process to increment the version value for the corresponding transaction data. The enlisted processes (e.g., Process-2 517, Process-3 519) increments (583,585) the version value for the corresponding key for the transaction. When the local copy of the transaction data in the transaction context 523 is no longer being used for the transaction, the transaction originator Process-1 515 can remove (586) the local copy from the transaction context 523.

Figure 6:
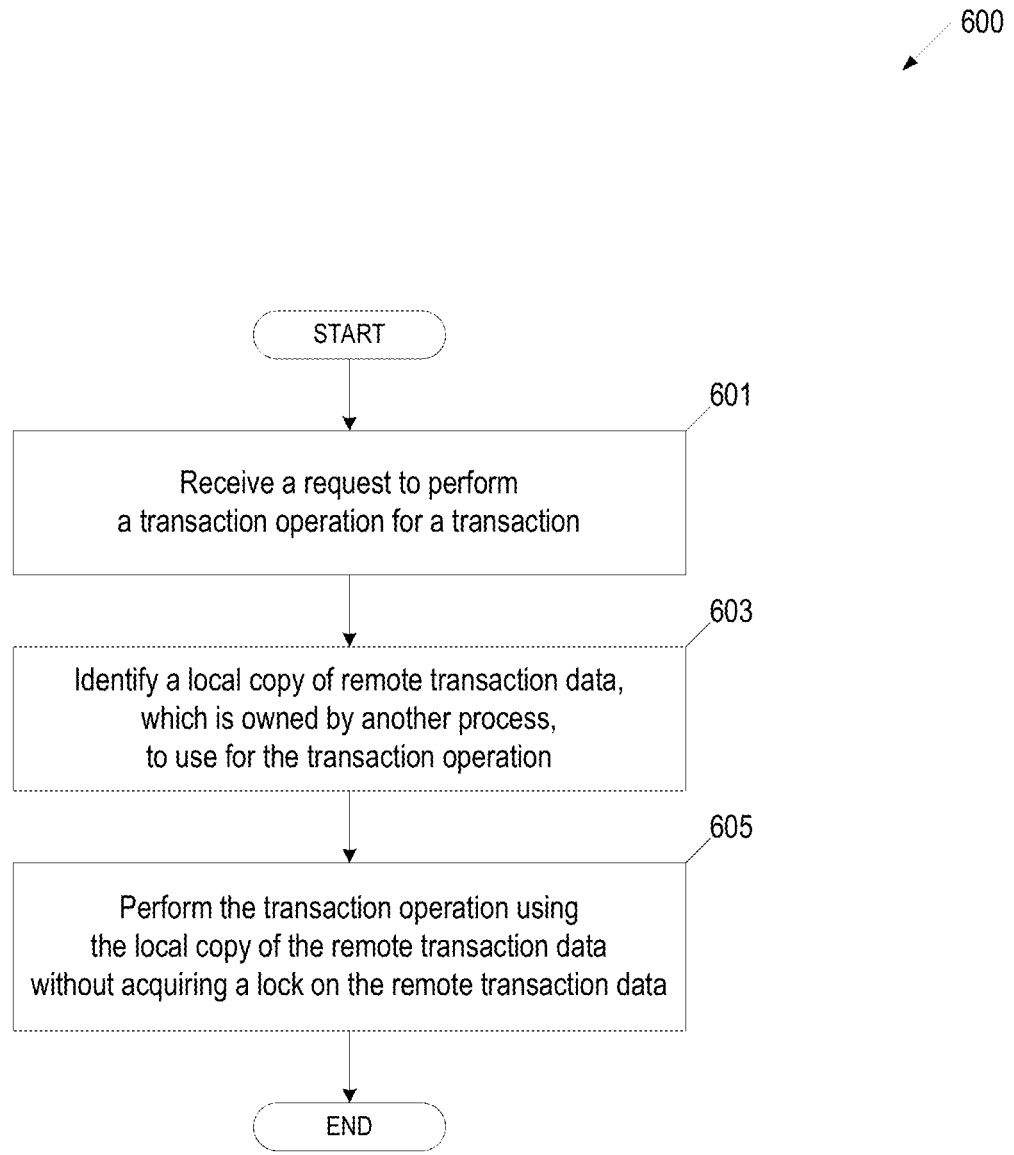
FIG. 6 is a flow diagram illustrating an embodiment for a method of a transaction originator process copying remote transaction data from enlisted processes(s) to a local transaction context.

FIG. 6 is a flow diagram of an embodiment of a method 600 for a transaction originator process copying remote transaction data from one or more enlisted processes to a local transaction context. Method 600 can be performed by processing logic that can comprise hardware (e.g., circuitry, dedicated logic, programmable logic, microcode, etc.), software (e.g., instructions run on a processing device), or a combination thereof. In one embodiment, method 600 is performed by at transaction originator process 123A executing in a machine 103 of FIG. 1.

At block 601, processing logic receives a request, for example, from a client application or a transaction manager, to perform a transaction operation (e.g., read, write) for a transaction. The request can be for one or more transaction operations for a transaction. At block 603, processing logic identifies a local copy of remote transaction data for the transaction operation. The copy is of transaction data that is owned by an enlisted process. The copy is stored in the transaction context of the transaction originator process. At block 605, processing logic performs the transaction operation (e.g., read, write) using the copy of the remote transaction data that is stored in the transaction context without acquiring a lock on the remote transaction data at the enlisted process. One embodiment of a transaction originator process reading data for a transaction using a local copy of remote transaction data is described in greater detail below in conjunction with FIG. 7. One embodiment of a transaction originator process writing data for a transaction using a local copy of remote transaction data is described in greater detail below in conjunction with FIG. 8. One embodiment of a transaction originator process preparing and committing a transaction using a local copy of remote transaction data is described in greater detail below in conjunction with FIG. 9.

Figure 7:
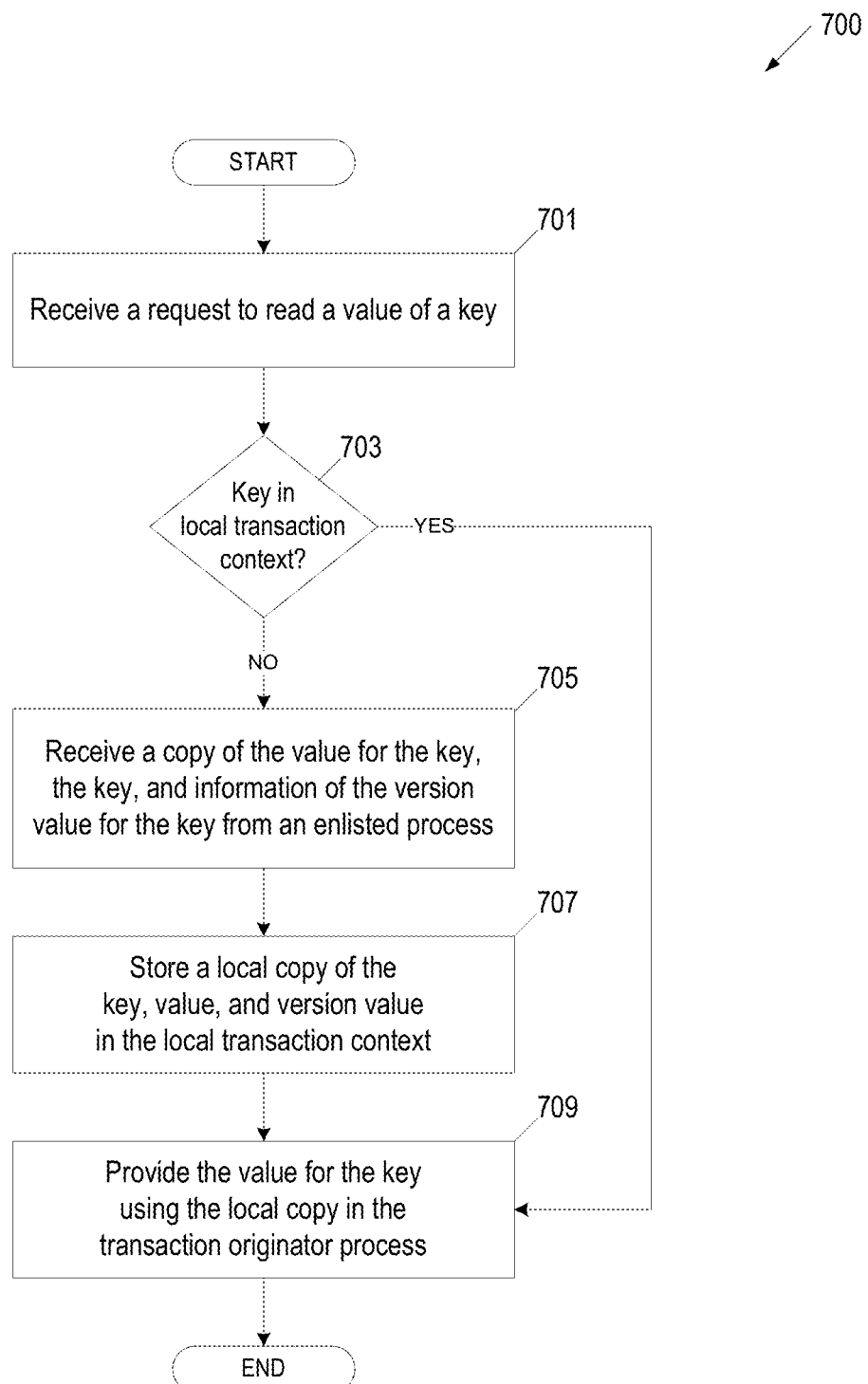
FIG. 7 is a flow diagram illustrating an embodiment for a method of reading data for a transaction using a local copy of remote transaction data.

FIG. 7 is a flow diagram of an embodiment of a method 700 for reading data for a transaction using a local copy of remote transaction data. Method 700 can be performed by processing logic that can comprise hardware (e.g., circuitry, dedicated logic, programmable logic, microcode, etc.), software (e.g., instructions run on a processing device), or a combination thereof. In one embodiment, method 700 is performed by a transaction originator process 123A executing in a machine 103 of FIG. 1.

At block 701, processing logic receives a request for a transaction to read a value for a key. The request can be a get (key) operation to read a particular key. The request can be from a transaction manager or a client application. The request can include a cache name. At block 703, processing logic determines whether the key is in the local transaction context. If the key is in the local transaction context, processing logic provides the value for the key using the local copy in the transaction originator process at block 709. If the key is not in the local transaction context (block 703), processing logic receives a copy of the value for the key from an enlisted process at block 705. Processing logic can also receive the key and information of the version value that is assigned to the value of the key. At block 707, processing logic stores the copy of the key, the value for the key, and the information for the version value in the local transaction context. In one embodiment, processing logic stores a pointer to the location at the enlisted process of the version value. In another embodiment, processing logic stores the actual version value. At block 709, processing logic provides the value to the client application using the local copy in the transaction context in the transaction originator process.

Figure 8:
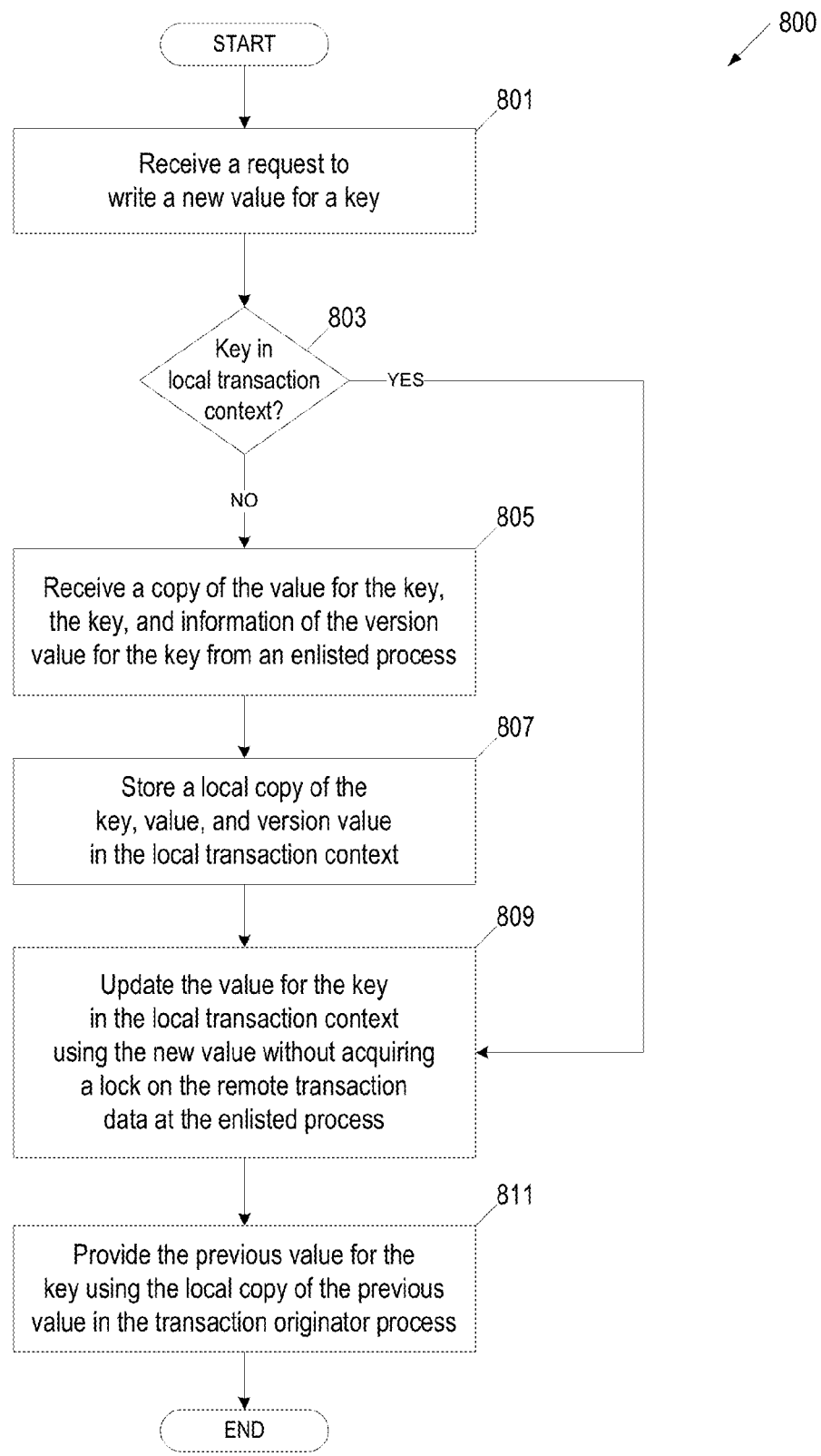
FIG. 8 is a flow diagram illustrating an embodiment for a method of writing data for a transaction using a local copy of remote transaction data.

FIG. 8 is a flow diagram of an embodiment of a method 800 for writing data for a transaction using a local copy of remote transaction data. Method 800 can be performed by processing logic that can comprise hardware (e.g., circuitry, dedicated logic, programmable logic, microcode, etc.), software (e.g., instructions run on a processing device), or a combination thereof. In one embodiment, method 800 is performed by a transaction originator process 123A executing in a machine 103 of FIG. 1.

At block 801, processing logic receives a request for a transaction to write a new value for a key. The request can be a put (key) operation to write a new value for a particular key. The request can be from a transaction manager or a client application. At block 803, processing logic determines whether the key is in the local transaction context. If the key is in the local transaction context, processing logic updates the value for the key in the local transaction context using the new value received in the request without acquiring a lock on the remote transaction data at the enlisted process at block 809. If the key is not in the local transaction context, processing logic receives a copy of the value for the key, the key, and information of the version value for the key from an enlisted process at block 805. At block 807, processing logic stores the copy of the key, the value for the key, and the information for the version value in the local transaction context. At block 809, processing logic updates the value for the key in the local transaction context using the new value received in the request without acquiring a lock on the remote transaction data at the enlisted process. At block 811, processing logic provides the previous value to the transaction manager and/or to the client application using the local copy of the previous value in the transaction originator process.

Figure 9:
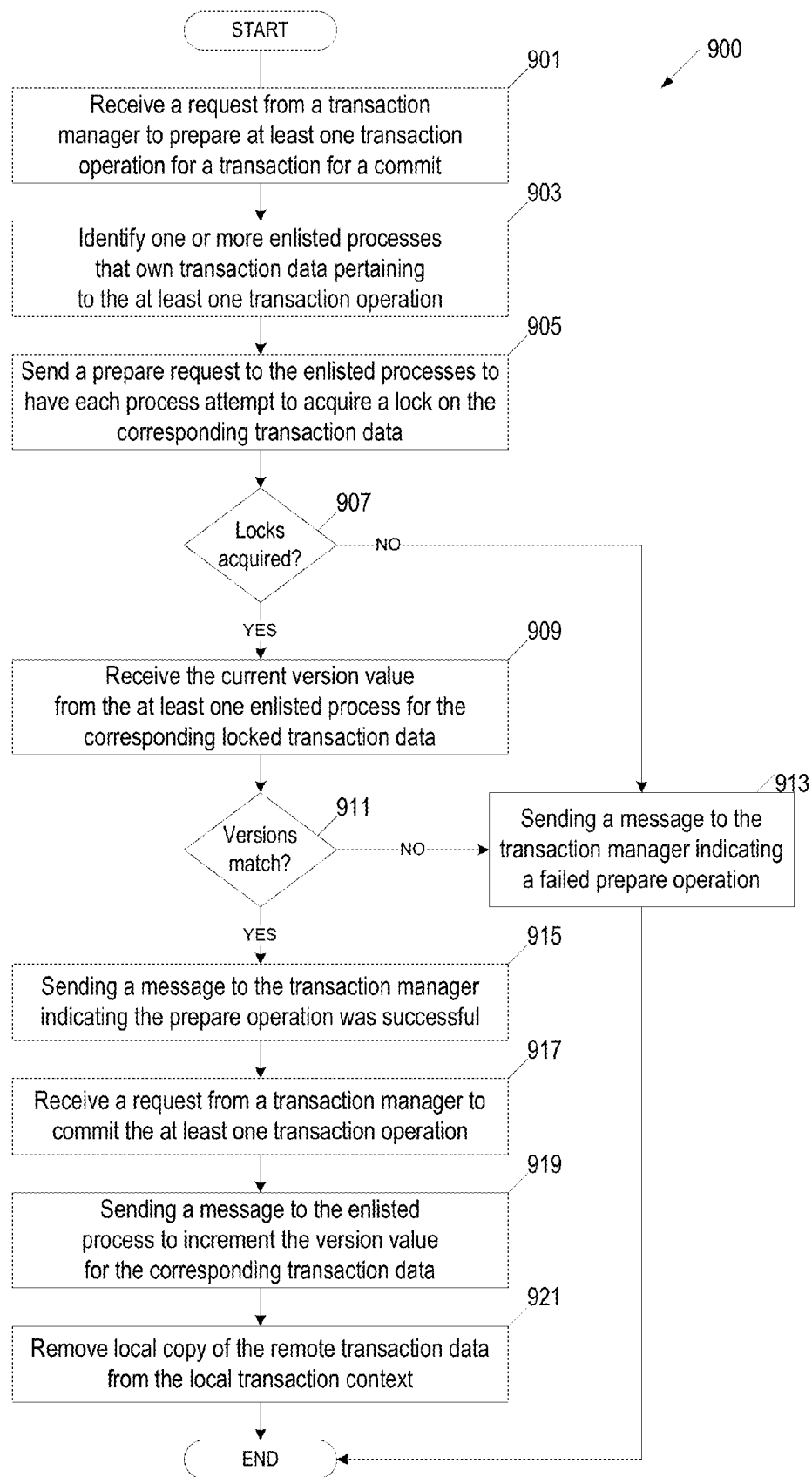
FIG. 9 is a flow diagram illustrating an embodiment for a method of preparing and committing a transaction using a local copy of remote transaction data.

FIG. 9 is a flow diagram of an embodiment of a method 900 for preparing and committing a transaction using a local copy of remote transaction data. Method 900 can be performed by processing logic that can comprise hardware (e.g., circuitry, dedicated logic, programmable logic, microcode, etc.), software (e.g., instructions run on a processing device), or a combination thereof. In one embodiment, method 900 is performed by a transaction originator process 123A executing in a machine 103 of FIG. 1.

At block 901, processing logic receives a prepare transaction request from an XA compliant transaction manager to prepare transaction operations for an XA transaction for a commit. At block 903, processing logic identifies one or more other processes (e.g., enlisted processes) in the cluster that own the transaction data pertaining to the transaction operations for the XA transaction. Processing logic can check the local transaction context to determine which keys are associated with the transaction and use mapping data, a consistent hashing algorithm, and the keys to determine which enlisted processes to send a prepare message to. At block 905, processing logic sends a prepare transaction request to the one or more enlisted processes. The enlisted processes receive the prepare transaction request and attempt to acquire a lock on the corresponding transaction data. At block 907, processing logic determines whether the locks are successfully acquired. Processing logic can receive a status message from each of the enlisted processes. If at least one lock is not acquired, (block 907) processing logic sends a message to the transaction manager indicating a failed prepare operation. If all of the locks are acquired (block 907), processing logic receives the current version value associated with the locked transaction data from the enlisted processes at block 909.

At block 911, for each locked transaction data, processing logic compares the current version value to the version value that is represented in the local transaction context to determine if there is a match. If there is at least one comparison that does not match (block 911), processing logic sends a message to the transaction manager indicating a failed prepare operation at block 913. If all of the comparisons result in a match (block 911), processing logic sends a message to the transaction manager indicating a successful prepare operation and that the transaction is ready for a commit at block 915. At block 917, processing logic receives a request from the transaction manager to commit the prepared transaction operation(s). At block 919, processing logic checks the local transaction context to determine which keys are associated with the transaction and sends a commit message via network calls over the network to all of the enlisted processes for the transaction to perform a commit operation. The commit message can include a request for the enlisted process to increment the version value for the corresponding transaction data. The enlisted process lock module on the enlisted process then releases the locks for the corresponding transaction data and increments the version value for the corresponding transaction data for the transaction. The enlisted process lock module can send a message to processing logic indicating whether the commit operation was successful. In one embodiment, at block 921, processing logic removes the local copy of the remote transaction data form the local transaction context in response to receiving a status message from the enlisted process lock module on the enlisted process indicating that the commit was successful.

Figure 10:
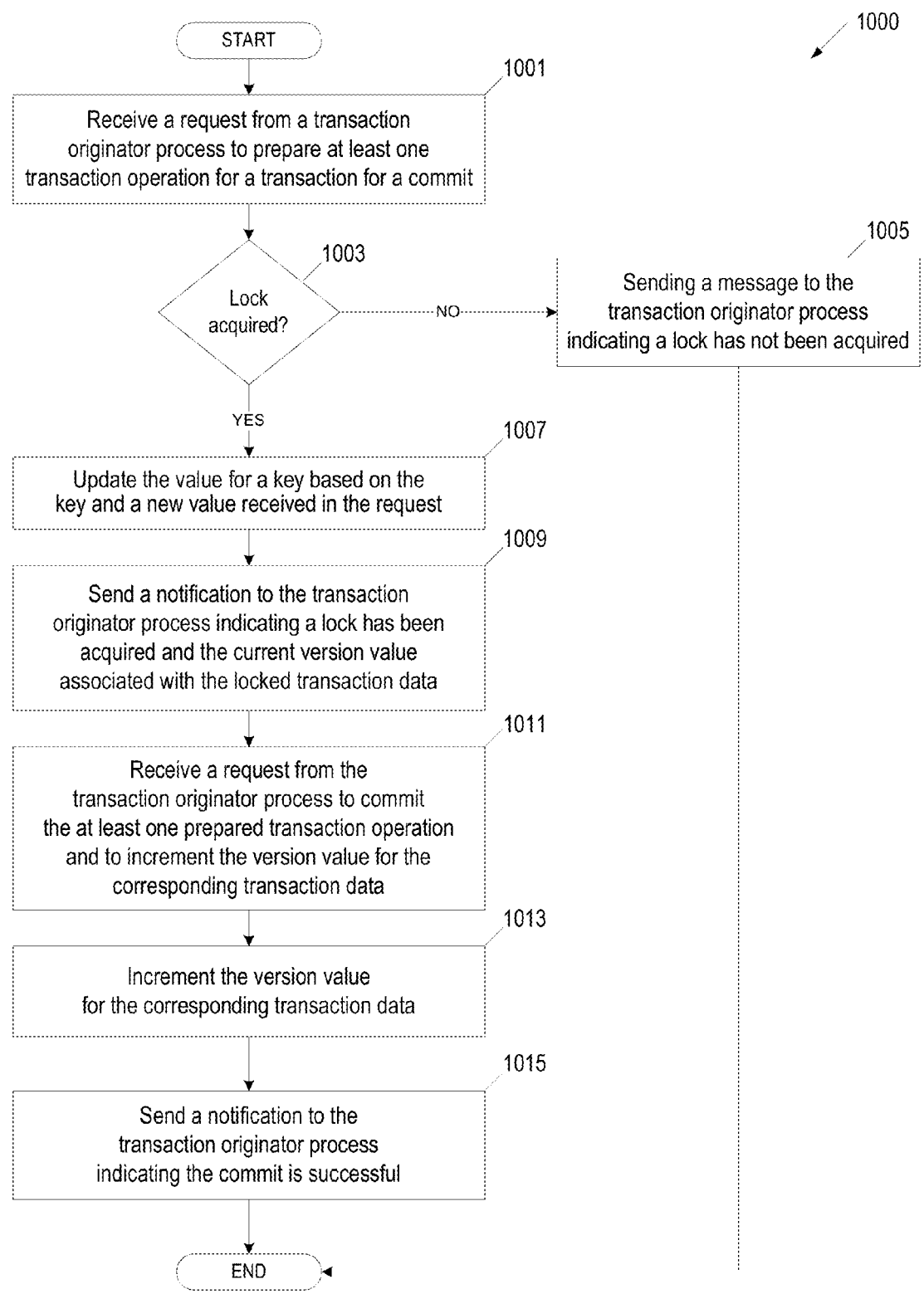
FIG. 10 is a flow diagram illustrating an embodiment for a method of committing remote transaction data that is owned by another process.

FIG. 10 is a flow diagram of an embodiment of a method 1000 of an enlisted process preparing and committing operations of a transaction. Method 1000 can be performed by processing logic that can comprise hardware (e.g., circuitry, dedicated logic, programmable logic, microcode, etc.), software (e.g., instructions run on a processing device), or a combination thereof. In one embodiment, method 1000 is performed by an enlisted process 123B,C executing in a machine 105,107 of FIG. 1.

At block 1001, processing logic receives a prepare transaction request from a transaction originator process to prepare transaction operations of an XA transaction for a commit. The prepare transaction request includes key and a new value for the key. At block 1003, processing logic attempts to acquire a lock for the key and its current value. If a lock is not acquired (block 1003), for example, because another transaction has already obtained a lock on the key and the current value, processing logic sends a message to the transaction originator process indicating a failed prepare operation at block 1005. If a lock is acquired (block 1003), processing logic updates the current value for a key in the local transaction context of the enlisted process based on the key and new value received in the request at block 1007. At block 1009, processing logic sends a notification to the transaction originator process indicating a lock has been acquired. Processing logic can include the current version value that is assigned to the key in the notification. At block 1011, processing logic receives a request from the transaction originator process to commit the prepared transaction operations. The commit transaction request can include a request to increment the current version value assigned to the key. At block 1013, processing logic releases the lock and increments the version value in response to the commit transaction request. In one embodiment, processing logic sends a message to the transaction originator process indicating a successful prepare operation at block 1015.

Figure 11:
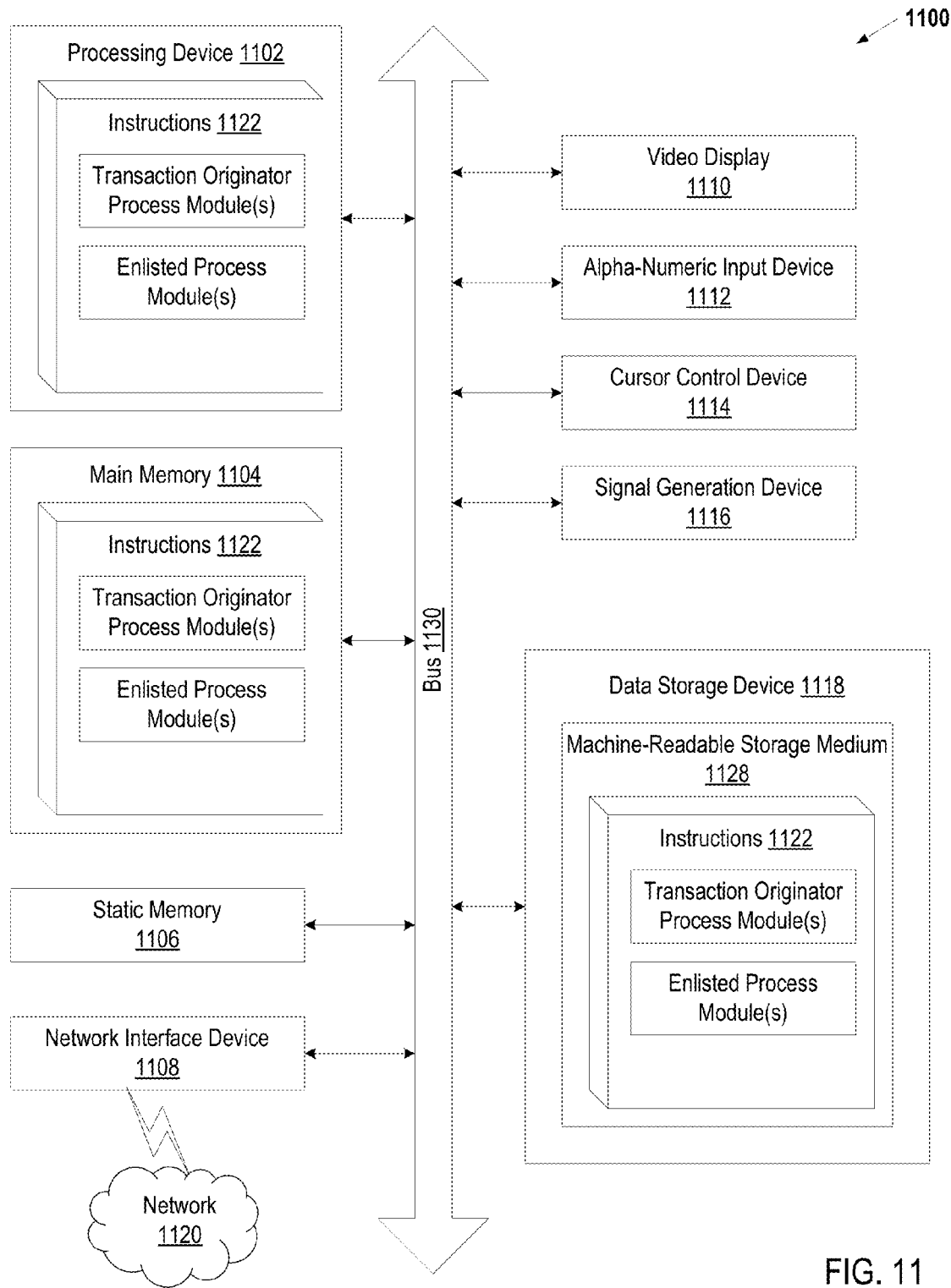
FIG. 11 is a block diagram of an exemplary computer system that may perform one or more of the operations described herein.

FIG. 11 illustrates a representation of a machine in the exemplary form of a computer system 1100 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device 1102, a main memory 1104 (e.g., read-only memory (ROM), flash memory, dynamic random access memory (DRAM) such as synchronous DRAM (SDRAM) or DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute instructions 1122 for performing the operations and steps discussed herein.

The computer system 1100 may further include a network interface device 1108 connected (e.g., networked) to network 1120. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a machine-readable storage medium 1128 (also known as a computer-readable medium) on which is stored one or more sets of instructions or software 1122 embodying any one or more of the methodologies or functions described herein. The instructions 1122 may also reside, completely or at least partially, within the main memory 1104 and/or within the processing device 1102 during execution thereof by the computer system 1100, the main memory 1104 and the processing device 1102 also constituting machine-readable storage media.

In one embodiment, the instructions 1122 include instructions for transaction originator process modules and enlisted process modules (e.g., module 201, 203, 205, 207 of FIG. 2, modules 401, 403, 405, 407 of FIG. 4) and/or a software library containing methods that call modules in a transaction originator process and modules in an enlisted process. While the machine-readable storage medium 1128 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "identifying" or "performing" or "determining" or "sending" or "comparing" or "storing" or "locating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present invention also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the invention have been described with reference to specific exemplary embodiments thereof. It will be evident that various modifications may be made thereto without departing from the broader spirit and scope of embodiments of the invention as set forth in the following claims. The specification and drawings are, accordingly, to be regarded in an illustrative sense rather than a restrictive sense.

What is claimed is:

1. A method comprising:
receiving, by a first process executing in a computer system in a data grid, a request to perform at least one transaction operation of a transaction in view of remote transaction data owned by at least one other process in the data grid, wherein the at least one other process has a capability to perform a prepare operation for the transaction;
identifying, by the first process, a local copy of the remote transaction data in a local data structure;
performing, by a processing device executing the first process in the computer system in the data grid, within the same transaction the at least one transaction operation using the local copy of the remote transaction data without acquiring a lock on the remote transaction data; and
acquiring, by the processing device executing the first process, within the same transaction the lock on the remote transaction data subsequent to said performing the at least one transaction operation using the local copy.

2. The method of claim 1, further comprising:
receiving, by the first process, a request to prepare the at least one transaction operation for a commit;
determining, by the first process, for each local copy of remote transaction data whether the corresponding at least one other process obtains a lock of the corresponding remote transaction data in response to the prepare request;
determining, by the first process, for each local copy of remote transaction data whether a version value associated with the local copy matches a current version value being maintained remotely at the corresponding at least one other process in response to determining locks are obtained, and sending a message indicating a failed prepare in response to determining locks are not obtained; and
sending a ready to prepare message in response to determining there is a match for each local copy of the remote transaction data, and sending a message indicating a failed prepare in response to determining there is not a match for at least one local copy of the remote transaction data.

3. The method of claim 2, further comprising:
receiving, by the first process, a request to commit the at least one transaction operation in response to sending a ready to prepare message; and
sending a message to the at least one other process to increment the current version value being maintained remotely at the at least one other process.

4. The method of claim 2, wherein determining whether the version values match comprises:
sending a network call to the at least one other process to request the current version value;
receiving the current version value; and
comparing the current version value to the version value represented in a local data store.

5. The method of claim 1, wherein identifying the local copy comprises:
sending a network call to the at least one other process to request a copy of the remote transaction data being managed by at least one other process;
receiving the copy of the remote transaction data from the at least one other process; and
storing the copy of the remote transaction data in the local data structure.

6. The method of claim 1, wherein identifying the local copy comprises:
locating a key in the local data structure that matches a key in the request; and
locating a value in the local data structure corresponding to the key.

7. A non-transitory computer-readable storage medium including instructions that, when executed by a processing device, cause the processing device to:
   provide, by a first process executing in the processing device in a data grid, a copy of transaction data owned by the first process to a second process, the copy of transaction data of the first process being associated with at least one transaction operation of a transaction, wherein the first process has an ability to prepare the transaction data for a commit operation;
   acquire, by the processing device executing the first process in the data grid, within the same transaction a lock on data of the first process, wherein the first process, earlier within the same transaction, did not acquire the lock;
   receive, by the first process, a request from the second process to commit the at least one transaction operation associated with the copy of the transaction data of the first process; and
   increment, by the first process, a version value associated with the copy of the transaction data of the first process.

8. The non-transitory computer-readable storage medium of claim 7, wherein to provide a copy further comprises:
   receive a network call from the second process to provide a current version value of the transaction data; and
   provide a representation of the current version value to the second process.

9. The non-transitory computer-readable storage medium of claim 8, wherein to provide the representation of the current version value comprises:
   provide a location of the version value associated with the copy of the transaction data.

10. The non-transitory computer-readable storage medium of claim 8, wherein to provide the representation of the current version value comprises:
    provide an actual version value associated with the copy of the transaction data.

11. The non-transitory computer-readable storage medium of claim 7, wherein to receive the request from the second process to commit comprises:
    receive a request to prepare transaction operations of a transaction for a commit;
    acquire a lock on data corresponding to a key related to a transaction operation of the transaction; and
    send a message indicating a lock has been acquired.

12. The non-transitory computer-readable storage medium of claim 7, wherein to increment the version value further comprises:
    release a lock on data corresponding to a key related to a transaction operation of the transaction.

13. The non-transitory computer-readable storage medium of claim 7, the processing device further to:
    store version data corresponding to at least one value corresponding to at least one key related to a transaction operation of the transaction, wherein the version data comprises at least one key and a version value corresponding to the at least one key.

14. The non-transitory computer-readable storage medium of claim 13, wherein when to increment the version value, the processing device to:
    add a new version value for a key to the stored version data.

15. A system comprising:
    a memory; and
    a processing device in a data grid, the processing device operatively coupled to the memory and to execute a first process to:
        receive a request to perform at least one transaction operation of a transaction in view of remote transaction data owned by at least one other process in the data grid, wherein the at least one other process has a capability to perform a prepare operation for the transaction;
        identify a local copy of the remote transaction data in a local data structure;
        perform within the same transaction the at least one transaction operation using the local copy of the remote transaction data without acquiring a lock on the remote transaction data; and
        acquire within the same transaction the lock on the remote transaction data subsequent to said performance of the at least one transaction operation using the local copy.

16. The system of claim 15, wherein the processing device is further to:
    receive a request to prepare the at least one transaction operation for a commit;
    determine for each local copy of remote transaction data whether the corresponding at least one other process obtains a lock of the corresponding remote transaction data in response to the prepare request;
    determine for each local copy of remote transaction data whether a version value associated with the local copy matches a current version value being maintained remotely at the corresponding at least one other process in response to determining locks are obtained, and send a message indicating a failed prepare in response to determining locks are not obtained; and
    send a ready to prepare message in response to determining there is a match for each local copy of the remote transaction data, and send a message indicating a failed prepare in response to determining there is not a match for at least one local copy of the remote transaction data.

17. The system of claim 16, wherein the processing device is further to:
    receive a request to commit the at least one transaction operation in response to sending a ready to prepare message; and
    send a message to the at least one other process to increment the current version value being maintained remotely at the at least one other process.

18. The system of claim 16, wherein to determine whether the version values match the processing device is further to:
    send a network call to the at least one other process to request the current version value;
    receive the current version value; and
    compare the current version value to the version value represented in a local data store.

19. The system of claim 15, wherein to identify the local copy the processing device is further to:
    send a network call to the at least one other process to request a copy of the remote transaction data being managed by at least one other process;
    receive the copy of the remote transaction data from the at least one other process; and
    store the copy of the remote transaction data in the local data structure.

20. The system of claim 15, wherein to identify the local copy the processing device is further to:
    locate a key in the local data structure that matches a key in the request; and
    locate a value in the local data structure corresponding to the key.

* * * * *